(12) United States Patent
Yoshikawa

(10) Patent No.: US 9,395,948 B2
(45) Date of Patent: Jul. 19, 2016

(54) SCREEN DISPLAY CONTROL SYSTEM AND SCREEN DISPLAY CONTROL METHOD

(71) Applicant: Alpine Electronics, Inc., Tokyo (JP)

(72) Inventor: Shinya Yoshikawa, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 115 days.

(21) Appl. No.: 13/687,633

(22) Filed: Nov. 28, 2012

(65) Prior Publication Data

US 2013/0141309 A1 Jun. 6, 2013

(30) Foreign Application Priority Data

Dec. 2, 2011 (JP) ................................. 2011-264182

(51) Int. Cl.
*G09G 5/00* (2006.01)
*G06F 3/14* (2006.01)

(52) U.S. Cl.
CPC .......... *G06F 3/1454* (2013.01); *G09G 2380/10* (2013.01)

(58) Field of Classification Search
CPC ........................... G06F 3/1454; G09G 2380/10
See application file for complete search history.

(56) References Cited

U.S. PATENT DOCUMENTS

| | | | | |
|---|---|---|---|---|
| 8,983,539 | B1* | 3/2015 | Kim ........................ | G06F 13/14 345/2.3 |
| 2002/0073235 | A1 | 6/2002 | Chen et al. | |
| 2005/0091571 | A1* | 4/2005 | Leichtling ............. | G06F 3/1454 715/203 |
| 2005/0179925 | A1* | 8/2005 | Asami ......................... | 358/1.13 |
| 2007/0199035 | A1* | 8/2007 | Schwartz ............... | H04N 7/163 725/110 |
| 2009/0089353 | A1* | 4/2009 | Fukuta et al. .................. | 709/201 |
| 2010/0069158 | A1* | 3/2010 | Kim .................. | 463/42 |
| 2011/0074656 | A1* | 3/2011 | Mizuno et al. .................. | 345/1.1 |
| 2011/0109934 | A1* | 5/2011 | Lee ............... | 358/1.15 |
| 2011/0173555 | A1* | 7/2011 | Miyoshi .................. | G06F 17/24 715/770 |
| 2011/0239265 | A1* | 9/2011 | Hinic .................... | G06F 3/1454 725/116 |
| 2012/0032783 | A1* | 2/2012 | Ahn ....................... | G06F 3/1423 340/6.1 |
| 2012/0054599 | A1* | 3/2012 | Nixon et al. .................. | 715/236 |
| 2012/0060109 | A1* | 3/2012 | Han ...................... | G06F 3/1454 715/769 |
| 2013/0132611 | A1* | 5/2013 | Setlur ...................... | G06F 3/00 710/5 |

FOREIGN PATENT DOCUMENTS

| | | |
|---|---|---|
| JP | 2001145074 | 5/2001 |
| JP | 2001223732 | 8/2001 |
| JP | 2002-125214 | 4/2002 |

(Continued)

OTHER PUBLICATIONS

Office Action for Japanese Patent Application No. 2011-264182 dated Jul. 7, 2015, 9 pgs. including English translation.

*Primary Examiner* — Adam R Giesy
(74) *Attorney, Agent, or Firm* — Brinks Gilson & Lione

(57) ABSTRACT

An information acquiring unit acquires from a server the same type of information to be shown correspondingly in vehicle-mounted apparatuses with respect to one content, and information display units cause their displays to show the information to be shown correspondingly in the apparatuses from the same type of information acquired by the information acquiring unit. An operation for a content acquisition request by one of the plurality of vehicle-mounted apparatuses may only be required for showing the same type of information in synchronization on displays of the vehicle-mounted apparatuses, without separate operations for a content acquisition request in the vehicle-mounted apparatuses.

9 Claims, 10 Drawing Sheets

(56) References Cited

FOREIGN PATENT DOCUMENTS

| | | |
|---|---|---|
| JP | 2005-141548 | 6/2005 |
| JP | 2005141548 | 6/2005 |
| JP | 2008153991 | 7/2008 |
| JP | 2008195394 | 8/2008 |
| JP | 2008306763 | 12/2008 |
| JP | 2010212775 | 9/2010 |
| JP | 2010250376 | 11/2010 |
| JP | 2011145747 | 7/2011 |

* cited by examiner

FIG. 1
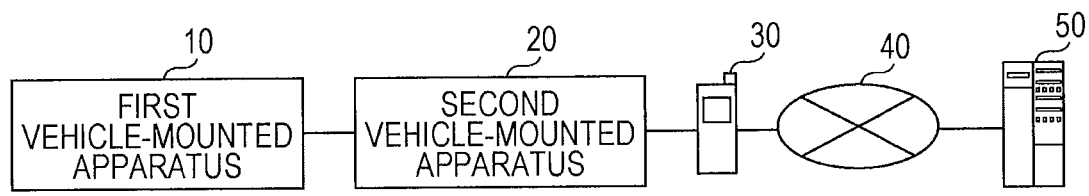
FIG. 2A    FIG. 2B
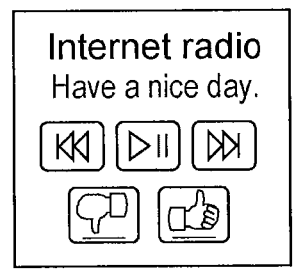

FIG. 4A

```
{
  "text":
  [
    {
      "name": "Yamada Taro",
      "value": "Have a nice day."
    },
    {
      "name": "Yoshida Takuro",
      "value": "Good Weather."
    },
    {
      "name": "Yamada Hanako",
      "value": "Good morning."
    }
  ],
  "button":
  [
    { "imageurl": "playpause.jpg" }
  ]
}
```

FIG. 4B

```
{
  "text":
  [
    { "value": "Have a nice day." },
  ],
  "button":
  [
    { "imageurl": "backward.jpg" },
    { "imageurl": "playpause.jpg" },
    { "imageurl": "forward.jpg" },
    { "imageurl": "dislike.jpg" },
    { "imageurl": "like.jpg" }
  ]
}
```

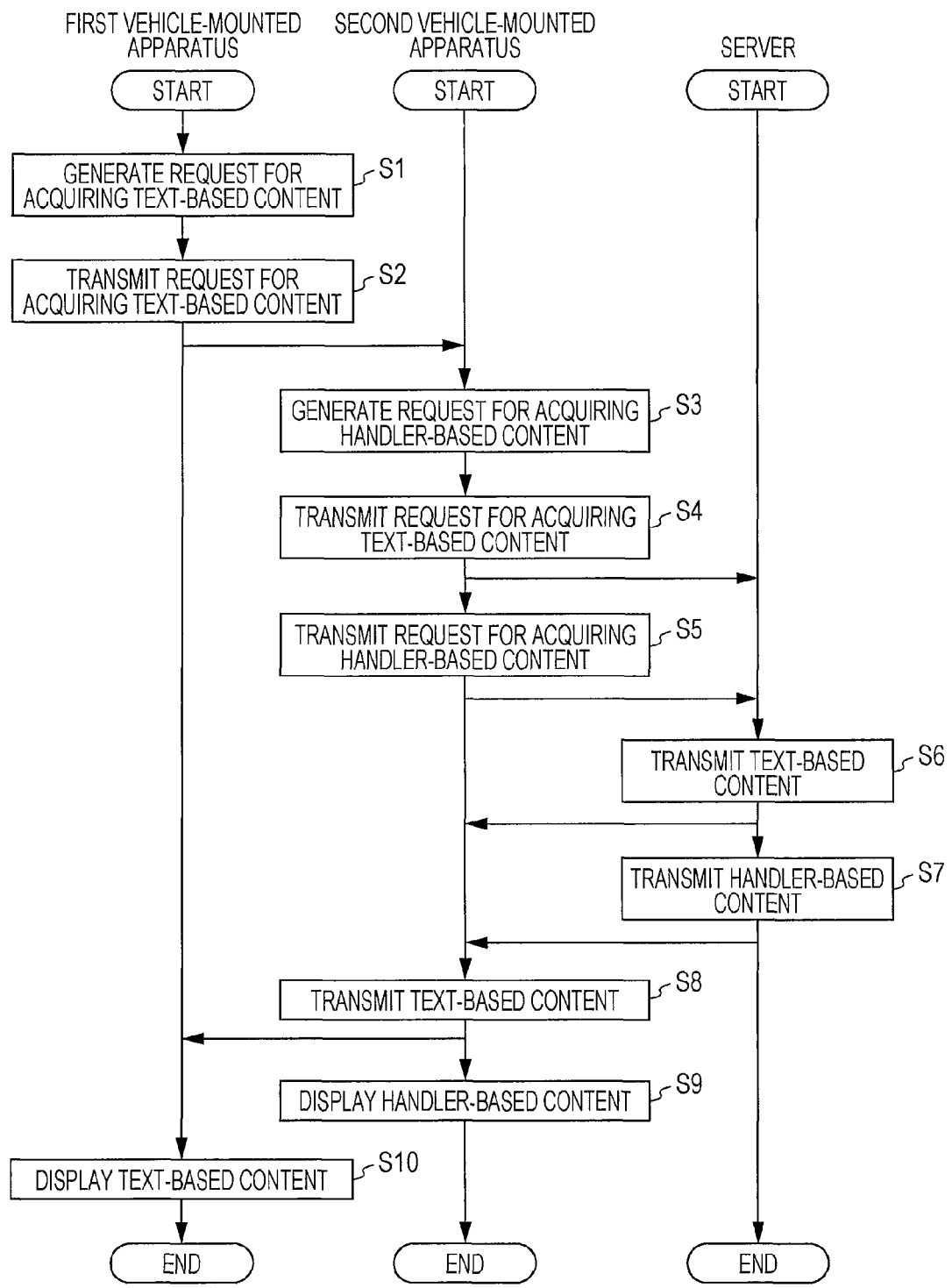

FIG. 8

```
{
  "templateID": [1, 2],
  "text":
  [
    {
      "name": "Yamada Taro",
      "value": "Have a nice day."
    },
    {
      "name": "Yoshida Takuro",
      "value": "Good Weather."
    },
    {
      "name": "Yamada Hanako",
      "value": "Good morning."
    }
  ],
  "button":
  [
    [
      { "imageurl": "playpause.jpg" }
    ],
    [
      { "imageurl": "backward.jpg" },
      { "imageurl": "playpause.jpg" },
      { "imageurl": "forward.jpg" },
      { "imageurl": "dislike.jpg" },
      { "imageurl": "like.jpg" }
    ]
  ]
}
```

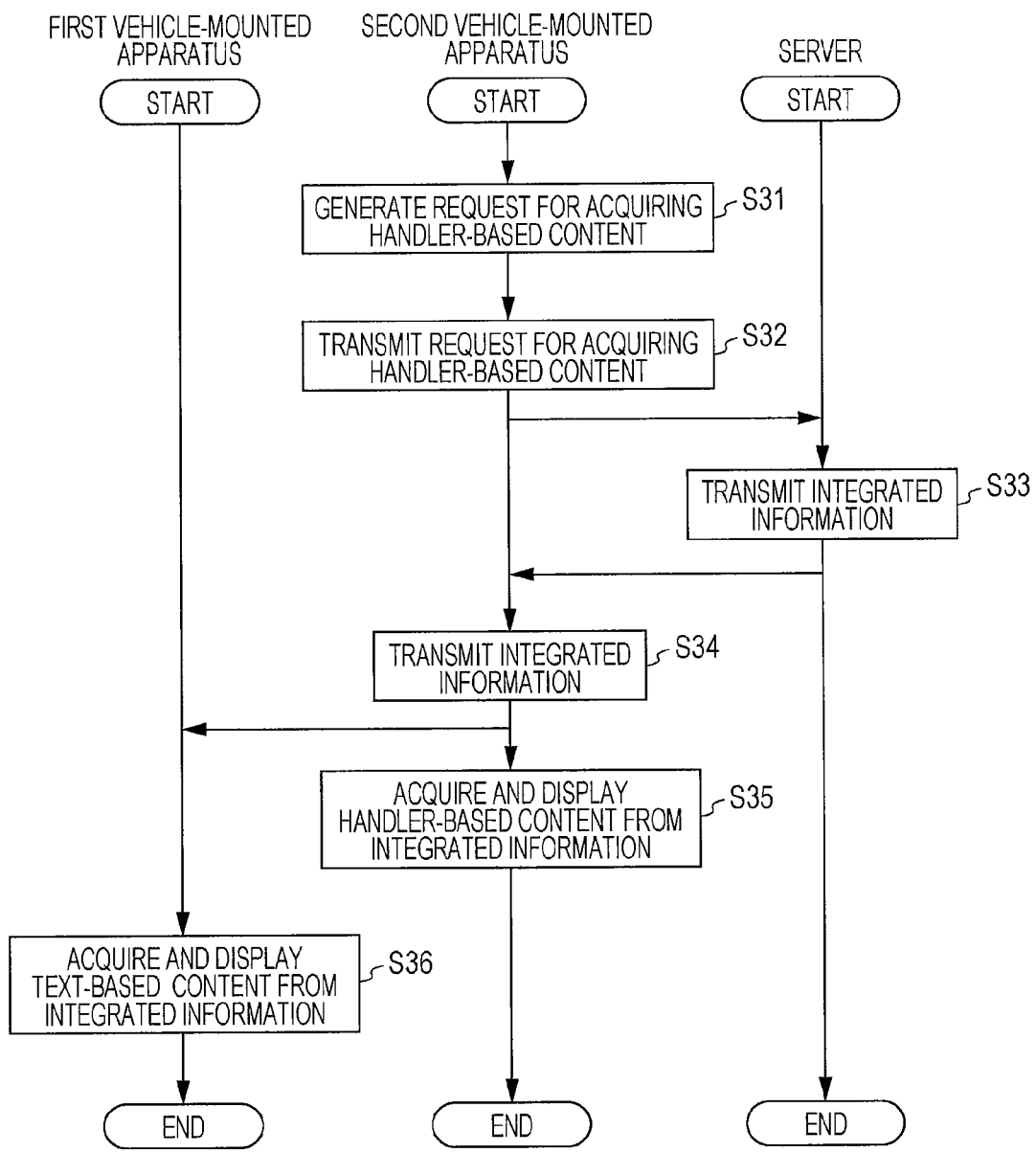

SCREEN DISPLAY CONTROL SYSTEM AND SCREEN DISPLAY CONTROL METHOD

BACKGROUND OF THE INVENTION

The present application claims priority to Japanese Patent Application Number 2011-264182, filed Dec. 2, 2011, the entirety of which is hereby incorporated by reference.

1. Field of the Invention

The present invention relates to screen display control systems and screen display control methods and is particularly suitable for use in a system which controls for displaying the same type of information on a plurality of displays (screens).

2. Description of the Related Art

Conventionally, technologies have been provided which display the same information on a plurality of displays (screens). For example, a technology exists which includes a front display on a front seat side of the interior of a vehicle and a rear display on a rear seat side, wherein a video played by a DVD (Digital Versatile Disk) may be displayed by them in synchronization.

Recently, a system has been proposed which includes a plurality of displays having different screen sizes on a front seat side in the interior of some luxury cars, wherein different kinds of information are shown on the displays. For example, as illustrated in FIG. 11, a plurality of vehicle-mounted apparatuses 501 and 502 with controllers each having a display may be provided, and the vehicle-mounted apparatuses 501 and 502 acquire and display different pieces of information from a server 503 over the Internet. In this case, it is configured such that a handler displayed as an icon may be manipulated by a user to implement a desired control.

In the system illustrated in FIG. 11, the information pieces shown on the displays of the vehicle-mounted apparatuses 501 and 502 are not synchronized. Separate and independent information pieces are shown on the displays. On the other hand, there is a demand for showing the same kinds of information (which are not completely the same but are related to each other) in synchronization. For example, there is a need for showing text-based information of one content acquired over the internet on a large-screen display and, in synchronization with it, handler-based information thereof on a small-screen display.

However, these needs may have not been addressed in the past. That is, even when one vehicle-mounted apparatus is operated to change the text-based information shown on a large screen display, the handler-based information being shown on the small-screen display may not be changed in synchronization. For that reason, an operation may be necessary for changing the handler-based information to be shown in the other vehicle-mounted apparatus.

Notably, a technology has been provided which plays a plurality of contents such as videos, animations, and Web contents in synchronization on the basis of a scenario describing a synchronization play table (see Japanese Unexamined Patent Application Publication No. 2002-125214, for example). However, the technology recited in Japanese Unexamined Patent Application Publication No. 2002-125214 relates to showing a plurality of contents on one display in synchronization and may not address the needs for showing the same type of information on a plurality of displays in synchronization.

Another technology exists which configures screen display data with an ID code indicative of a specific display form and text or image data to be pasted onto the display form (see Japanese Unexamined Patent Application Publication No. 2005-141548, for example). According to the technology recited in Japanese Unexamined Patent Application Publication No. 2005-141548, a mobile terminal having received screen display data from a server extracts an ID code from the screen display data and invokes the display form identified with the ID code. A display screen is created by pasting text and/or image data according to the style defined by the display form. However, even Japanese Unexamined Patent Application Publication No. 2005-141548 does not disclose a system causing a plurality of displays to show the same type of information in synchronization.

The present invention was made in order solve this problem. It is an object of the present invention to allow showing the same type of information of one content acquired over the Internet on a plurality of displays.

SUMMARY

In order to achieve the object, an embodiment of the present invention includes an information acquiring unit which, when one of the plurality of electronic apparatuses issues a content acquisition request, acquires from the server through the electronic apparatus connectable to the Internet the same type of information to be shown correspondingly in the plurality of electronic apparatuses with respect to the content according to the acquisition request, and information display units which cause the displays to show the information acquired by their electronic apparatuses to be shown correspondingly in the electronic apparatuses from the same type of information acquired by the information acquiring unit.

According to the embodiment configured as described above, when one of a plurality of electronic apparatus issues a content acquisition request, not only the information to be shown in the electronic apparatus that has issued the acquisition request but also the same type of information to be shown in other electronic apparatuses in conjunction are acquired from a server. The same type of information is acquired and is displayed in the plurality of electronic apparatuses.

This may eliminate the necessity for separate operations for content acquisition requests in a plurality of electronic apparatuses so that the same type of information may be shown on displays of the plurality of electronic apparatuses. In other words, an operation for a content acquisition request by one of a plurality of electronic apparatuses may only be required for showing the same type of information to be displayed in synchronization on displays of the plurality of electronic apparatuses.

BRIEF DESCRIPTION OF THE DRAWINGS

FIG. 1 illustrates an overall configuration example of a screen display control system according to the first and second embodiment;

FIGS. 2A and 2B illustrate examples of the same type of information to be shown on displays of the vehicle-mounted apparatuses according to the first and second embodiments;

FIGS. 4A and 4B illustrate examples of the same type of information to be acquired by the information acquiring unit according to the first embodiment;

FIG. 5 is a flowchart illustrating an operation example to be performed when a text-based content acquisition request is issued by the first vehicle-mounted apparatus according to the first embodiment;

FIG. 8 illustrates an example of the integrated information acquired by the information acquiring unit according to the second embodiment;

FIG. 10 is a flowchart of an operation example to be performed when the second vehicle-mounted apparatus issues a handler-based content acquisition request according to the second embodiment.

DESCRIPTION OF THE PREFERRED EMBODIMENTS

First Embodiment

Figure 3:
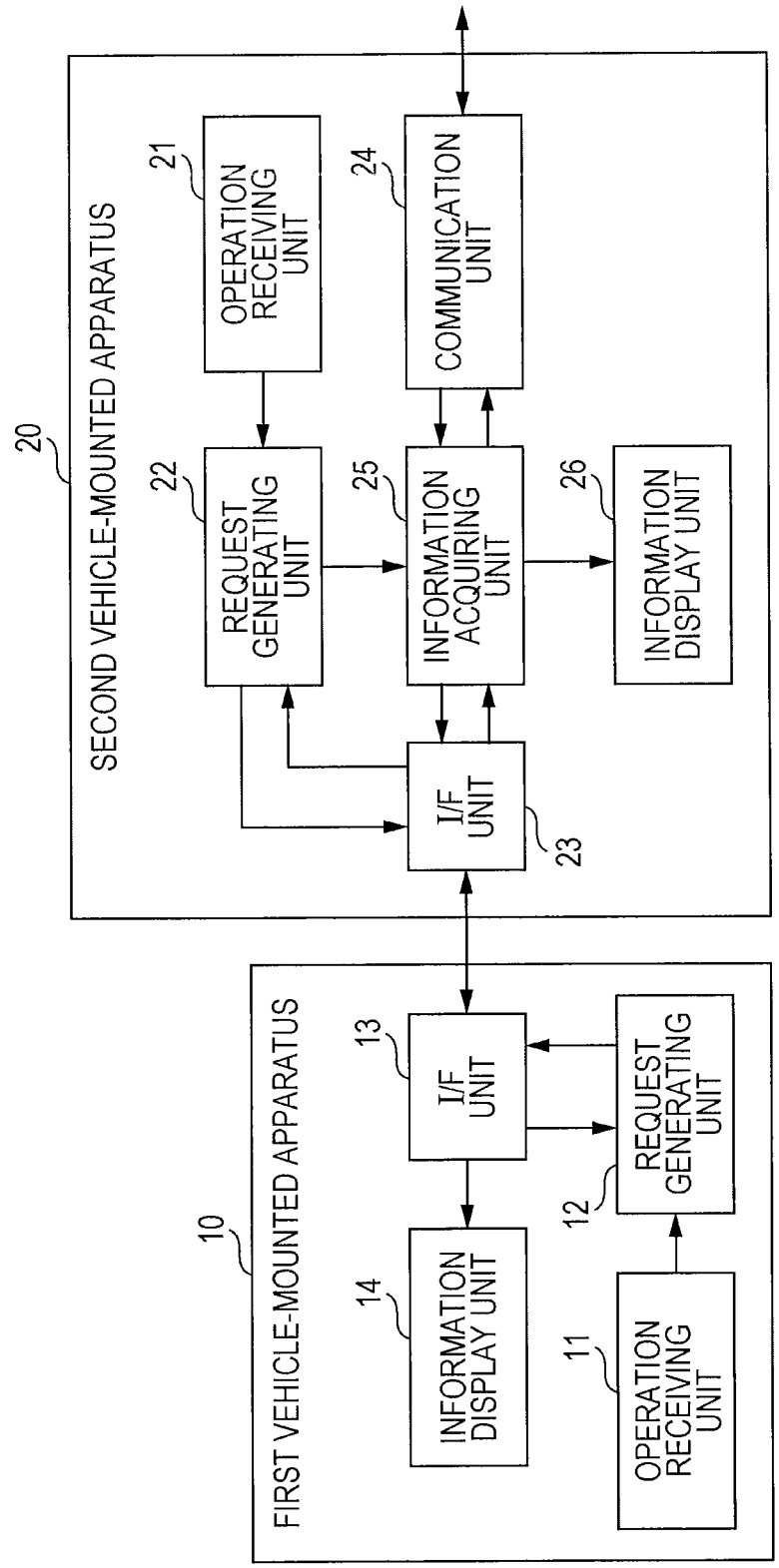
FIG. 3 is a block diagram illustrating functional component examples of the vehicle-mounted apparatuses according to the first embodiment.

A first embodiment according to the present invention will be described below with reference to the attached drawings. FIG. 1 illustrates an overall configuration example of a screen display control system according to the first embodiment. As illustrated in FIG. 1, a screen display control system according to the first embodiment includes vehicle-mounted apparatuses 10 and 20 (first vehicle-mounted apparatus 10 and second vehicle-mounted apparatus 20) with controllers each having a display, and the plurality of vehicle-mounted apparatuses 10 and 20 are connected to each other over an in-vehicle network.

According to this embodiment, a cellular phone 30 is connected to the second vehicle-mounted apparatus 20. The second vehicle-mounted apparatus 20 is configured to use a communication function of the cellular phone 30 for connectivity with a server 50 over the Internet 40. The vehicle-mounted apparatuses 10 and 20 cause displays of the vehicle-mounted apparatuses 10 and 20 to show information acquired by the second vehicle-mounted apparatus 20 from the server 50 over the Internet 40.

The information acquired by the second vehicle-mounted apparatus 20 from the server 50 is the same type of information (information pieces that are not completely the same but are related to each other) to be shown on the displays of the vehicle-mounted apparatuses 10 and 20 with respect to the same content. For example, the first vehicle-mounted apparatus 10 may include a large screen display and cause the large screen display to show text-based information. On the other hand, the second vehicle-mounted apparatus 20 may have a small-screen display and cause the small-screen display to show handler-based information.

FIGS. 2A and 2B illustrate examples of the same type of information to be shown on displays of the vehicle-mounted apparatuses 10 and 20. In this case, the same content to be shown on the displays of the vehicle-mounted apparatuses 10 and 20 may be a content related to the Internet radio. FIG. 2A illustrates information to be shown on the display of the first vehicle-mounted apparatus 10, and FIG. 2B illustrates information to be shown on the display of the second vehicle-mounted apparatus 20. Though the large screen display of the first vehicle-mounted apparatus 10 shows text-based information, less necessary operation icons are also shown. The small-screen display of the second vehicle-mounted apparatus 20 shows handler-based information containing a plurality of kinds of operation icon.

FIG. 3 is a block diagram illustrating functional component examples of the vehicle-mounted apparatuses 10 and 20 according to the first embodiment. As illustrated in FIG. 3, the first vehicle-mounted apparatus 10 includes functional components of an operation receiving unit 11, a request generating unit 12, an I/F unit 13 and an information display unit 14. The second vehicle-mounted apparatus 20 includes functional components of an operation receiving unit 21, a request generating unit 22, an I/F unit 23, a communication unit 24, an information acquiring unit 25 and an information display unit 26.

The function blocks that the vehicle-mounted apparatuses 10 and 20 include may be implemented by hardware components, DSP or software. For example, if they are implemented by software, the vehicle-mounted apparatuses 10 and 20 according to this embodiment may include a CPU or an MPU, a RAM, a ROM, a hard disk and/or the like and may be implemented by an operation by a program stored in a ROM or hard disk.

The operation receiving unit 11 in the first vehicle-mounted apparatus 10 receives an operation by a user on the first vehicle-mounted apparatus 10. More specifically, the operation receiving unit 11 receives an operation for an acquisition request for a desired content. The operation receiving unit 11 having received an operation for a content acquisition request notifies the request generating unit 12 accordingly.

The request generating unit 12 generates an acquisition request for a content (text-based information, more specifically) in accordance with the operation received by the operation receiving unit 11. The request generating unit 12 also generates an acquisition request for a content (text-based information, more specifically) when it receives a notification of generation of an acquisition request for a content (handler-based information, more specifically) from the second vehicle-mounted apparatus 20 through the I/F unit 13. The request generating unit 12 supplies the generated content acquisition request to the I/F unit 13. A content relating to text-based information will be called a "text-based content", and a content relating to handler-based information will be called a "handler-based content".

The I/F unit 13 exchanges information with the second vehicle-mounted apparatus 20 over an in-vehicle network. For example, the I/F unit 13 transmits a text-based content acquisition request generated by the request generating unit 12 to the second vehicle-mounted apparatus 20. The I/F unit 13 receives a handler-based content-acquisition-request generation notification transmitted from the second vehicle-mounted apparatus 20 and supplies it to the request generating unit 12. The I/F unit 13 receives a text-based content transmitted from the second vehicle-mounted apparatus 20 and supplies it to the information display unit 14.

The information display unit 14 acquires the text-based content transmitted from the second vehicle-mounted apparatus 20 through the I/F unit 13 and causes a large screen display (not shown) of the first vehicle-mounted apparatus 10 to display it.

The operation receiving unit 21 in the second vehicle-mounted apparatus 20 receives an operation by a user on the second vehicle-mounted apparatus 20. More specifically, the operation receiving unit 21 receives an operation for requesting the acquisition of a desired content. When the operation receiving unit 21 receives an operation for a content acquisition request, the operation receiving unit 21 notifies the request generating unit 22 accordingly.

The request generating unit 22 generates a handler-based content acquisition request in accordance with a manipulation received by the operation receiving unit 21. The request generating unit 22 supplies the generated handler-based content acquisition request to the information acquiring unit 25 and supplies a handler-based content-acquisition-request generation notification to the I/F unit 23. When the request generating unit 22 receives a text-based content acquisition request from the first vehicle-mounted apparatus 10 through the I/F unit 23, the request generating unit 22 generates the handler-based content acquisition request. The request generating unit 22 supplies the generated handler-based content acquisition request to the information acquiring unit 25.

The I/F unit 23 exchanges information with the first vehicle-mounted apparatus 10 over an in-vehicle network. For example, when the request generating unit 22 generates a handler-based content acquisition request, the I/F unit 23 transmits a handler-based content-acquisition-request generation notification to the first vehicle-mounted apparatus 10. The I/F unit 23 receives a text-based content acquisition request transmitted from the first vehicle-mounted apparatus 10 and supplies it to the request generating unit 22 and information acquiring unit 25. The I/F unit 23 transmits the text-based content acquired by the information acquiring unit 25 through the communication unit 24 to the first vehicle-mounted apparatus 10.

The communication unit 24 uses a communication function of the cellular phone 30 to transmit a content acquisition request to the server 50 over the Internet 40 and receives the content (text-based content and handler-based content) based on the request from the server 50.

When one of the vehicle-mounted apparatuses 10 and 20 issues a content acquisition request, the information acquiring unit 25 acquires the same type of information (text-based content and handler-based content) to be shown in the vehicle-mounted apparatuses 10 and 20 with respect to the content according to the acquisition request from the server 50 through the communication unit 24.

FIGS. 4A and 4B illustrate examples of the same type of information to be acquired by the information acquiring unit 25. FIG. 4A illustrates a text-based content, and FIG. 4B illustrates a handler-based content. The text-based content illustrated in FIG. 4A corresponds to the screen example in FIG. 2A, and the handler-based content illustrated in FIG. 4B corresponds to the screen example in FIG. 2B.

For example, when the request generating unit 22 in the second vehicle-mounted apparatus 20 generates a handler-based content acquisition request, it is supplied to the information acquiring unit 25, and a handler-based content-acquisition-request generation notification therefor is transmitted to the first vehicle-mounted apparatus 10 through the I/F unit 23. In the first vehicle-mounted apparatus 10, the request generating unit 12 generates a text-based content acquisition request in response to the generation notification, and the text-based content acquisition request is transmitted to the second vehicle-mounted apparatus 20 through the I/F unit 13. It is then supplied to the information acquiring unit 25.

The information acquiring unit 25 supplies the text-based content acquisition request transmitted from the first vehicle-mounted apparatus 10 and the handler-based content acquisition request generated by the request generating unit 22 in the second vehicle-mounted apparatus 20 to the server 50 through the communication unit 24. In response, the text-based content and handler-based content are acquired from the server 50. The acquired handler-based content is supplied to the information display unit 26, and the text-based content is transmitted to the first vehicle-mounted apparatus 10 through the I/F unit 23.

When the request generating unit 12 in the first vehicle-mounted apparatus 10 generates a text-based content acquisition request, it is transmitted to the second vehicle-mounted apparatus 20 through the I/F unit 13 and is supplied from the I/F unit 23 to the request generating unit 22 and information acquiring unit 25. In response, the request generating unit 22 generates a handler-based content acquisition request and supplies it to the information acquiring unit 25.

The information acquiring unit 25 transmits the text-based content acquisition request transmitted from the first vehicle-mounted apparatus 10 and the handler-based content acquisition request generated by the request generating unit 22 in the second vehicle-mounted apparatus 20 to the server 50 through the communication unit 24. In response, the text-based content and handler-based content is acquired from the server 50. The acquired handler-based content is supplied to the information display unit 26, and the text-based content is transmitted to the first vehicle-mounted apparatus 10 through the I/F unit 23.

The information display unit 26 acquires the handler-based content to be shown in the second vehicle-mounted apparatus 20 from contents relating to the same type of information acquired by the information acquiring unit 25 from the server 50 and causes the small-screen display (not shown) of the second vehicle-mounted apparatus 20 to display it.

Next, an operation in the screen display control system according to the first embodiment configured as described above will be described. FIG. 5 is a flowchart illustrating an operation example to be performed when a text-based content acquisition request is generated by the request generating unit 12 in the first vehicle-mounted apparatus 10. Notably, the flowchart illustrated in FIG. 5 starts when the operation receiving unit 11 in the first vehicle-mounted apparatus 10 receives an operation for a text-based content acquisition request.

First of all, the request generating unit 12 generates a text-based content acquisition request (step S1) and supplies it to the I/F unit 13. The I/F unit 13 transmits the text-based content acquisition request supplied by the request generating unit 12 to the second vehicle-mounted apparatus 20 (step S2). Notably, the text-based content acquisition request contains identification information for identifying the first vehicle-mounted apparatus 10 that is the request subject.

In the second vehicle-mounted apparatus 20, the transmitted text-based content acquisition request is received from the first vehicle-mounted apparatus 10 through the I/F unit 23. The I/F unit 23 supplies the received text-based content acquisition request to the request generating unit 22 and information acquiring unit 25. In response, the request generating unit 22 generates a handler-based content acquisition request (step S3) and supplies it to the information acquiring unit 25. Notably, the handler-based content acquisition request contains identification information for identifying the second vehicle-mounted apparatus 20 that is the request subject.

The information acquiring unit 25 transmits to the server 50 through the communication unit 24 the text-based content acquisition request transmitted from the first vehicle-mounted apparatus 10 (step S4) and transmits the handler-based content acquisition request generated by the request generating unit 22 in the second vehicle-mounted apparatus 20 to the server 50 (step S5). The server 50 in response to those acquisition request transmits the text-based content to the second vehicle-mounted apparatus 20 (step S6) and transmits the handler-based content to the second vehicle-mounted apparatus 20 (step S7). Notably, the content to be transmitted by the server 50 has the identification information of the subject apparatus contained in the content acquisition request.

In the second vehicle-mounted apparatus 20, the information acquiring unit 25 transmits to the first vehicle-mounted apparatus 10 through the I/F unit 23 the text-based content to be shown in first vehicle-mounted apparatus 10 out of contents relating to the same type of information received from the server 50 (step S8). The text-based content to be transmitted to the first vehicle-mounted apparatus 10 may be determined on the basis of the identification information of the request subject, which is associated with it.

In the second vehicle-mounted apparatus 20, the information display unit 26 acquires the handler-based content to be shown in the second vehicle-mounted apparatus 20 out of the contents relating to the same type of information acquired by the information acquiring unit 25 from the server 50 and causes the display to show it (step S9). The handler-based content to be shown in the second vehicle-mounted apparatus 20 may be determined on the basis of the identification information of the request subject, which is associated with it.

On the other hand, in the first vehicle-mounted apparatus 10, the information display unit 14 acquires the text-based content transmitted from the second vehicle-mounted apparatus 20 and causes the display to show it (step S10). Thus, the processing in the flowchart illustrated in FIG. 5 ends.

Figure 6:
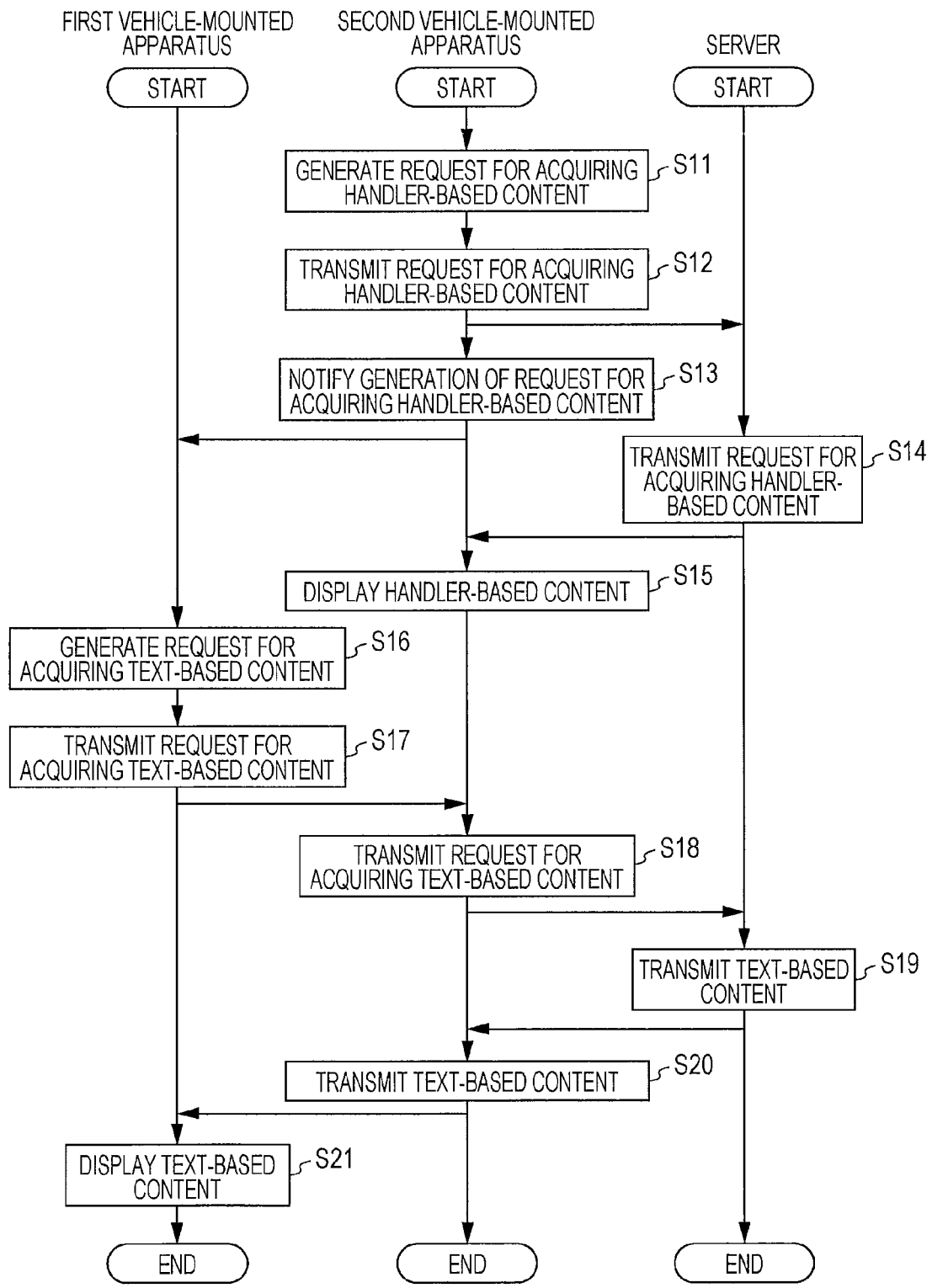
FIG. 6 is a flowchart illustrating an operation example to be performed when a handler-based content acquisition request is issued by the second vehicle-mounted apparatus according to the first embodiment.

FIG. 6 is a flowchart of an operation example to be performed when the request generating unit 22 in the second vehicle-mounted apparatus 20 generates a handler-based content acquisition request. Notably, the flowchart illustrated in FIG. 6 starts when the operation receiving unit 21 in the second vehicle-mounted apparatus 20 receives an operation for a handler-based content acquisition request.

First of all, the request generating unit 22 generates a handler-based content acquisition request (step S11) and supplies it to the I/F unit 23 and information acquiring unit 25. The information acquiring unit 25 transmits the handler-based content acquisition request to the server 50 through the communication unit 24 (step S12). The I/F unit 23 transmits a handler-based content-acquisition-request generation notification to the first vehicle-mounted apparatus 10 (step S13).

The server 50 transmits the handler-based content to the second vehicle-mounted apparatus 20 (step S14) in response to the handler-based content acquisition request transmitted from the second vehicle-mounted apparatus 20. In the second vehicle-mounted apparatus 20, the information acquiring unit 25 acquires the handler-based content transmitted from the server 50 through the communication unit 24. The information display unit 26 causes the display to show the handler-based content acquired by the information acquiring unit 25 (step S15).

In the first vehicle-mounted apparatus 10, the handler-based content-acquisition-request generation notification transmitted from the second vehicle-mounted apparatus 20 through the I/F unit 13 is provided to the request generating unit 12. In response to the notification, the request generating unit 12 generates a text-based content acquisition request and supplies it to the I/F unit 13 (step S16). The I/F unit 13 transmits the text-based content acquisition request generated by the request generating unit 12 to the second vehicle-mounted apparatus 20 (step S17).

In the second vehicle-mounted apparatus 20, the text-based content acquisition request transmitted from the first vehicle-mounted apparatus 10 is received by the I/F unit 23 and is supplied to the information acquiring unit 25. The information acquiring unit 25 transmits the text-based content acquisition request to the server 50 through the communication unit 24 (step S18). The server 50 in response to the acquisition request transmits the text-based content to the second vehicle-mounted apparatus 20 (step S19).

In the second vehicle-mounted apparatus 20, the text-based content transmitted from the server 50 is received by the I/F unit 23 and is supplied to the information acquiring unit 25. The information acquiring unit 25 transmits the text-based content to the first vehicle-mounted apparatus 10 through the I/F unit 23 (step S20). In the first vehicle-mounted apparatus 10, the information display unit 14 acquires the text-based content transmitted from the second vehicle-mounted apparatus 20 and causes the display to show it (step S21). Thus, the processing in the flowchart illustrated in FIG. 6 ends.

As described above in detail, according to the first embodiment, when one of the plurality of vehicle-mounted apparatuses 10 and 20 issues a content acquisition request, the same type of information (text-based content and handler-based content) to be shown in the plurality of vehicle-mounted apparatuses 10 and 20 is separately acquired by the information acquiring unit 25 from the server 50. The information display units 14 and 26 then acquire the information to be shown in the respective vehicle-mounted apparatuses 10 and 20 from the same type of information acquired by the information acquiring unit 25 and cause the respective displays to display the information.

According to the first embodiment, when one of the plurality of vehicle-mounted apparatuses 10 and 20 issues a content acquisition request, not only the information to be shown in the vehicle-mounted apparatus having issued the acquisition request but also the same type of information to be shown in the other vehicle-mounted apparatus may be acquired by the information acquiring unit 25 from the server 50. The same type of information pieces are acquired by the information display units 14 and 26 in the plurality of vehicle-mounted apparatuses 10 and 20 and are shown on the respective displays.

This may eliminate the necessity for issuing an operation for a content acquisition request separately by each of the vehicle-mounted apparatuses 10 and 20 in order to show the same type of information pieces on displays of the plurality of vehicle-mounted apparatuses 10 and 20. In other words, issuing an operation for a content acquisition request by one of the vehicle-mounted apparatuses 10 and 20 allows the same type of information pieces to be shown with respect to the requested content in synchronization on displays of the plurality of vehicle-mounted apparatuses 10 and 20.

Second Embodiment

Figure 7:
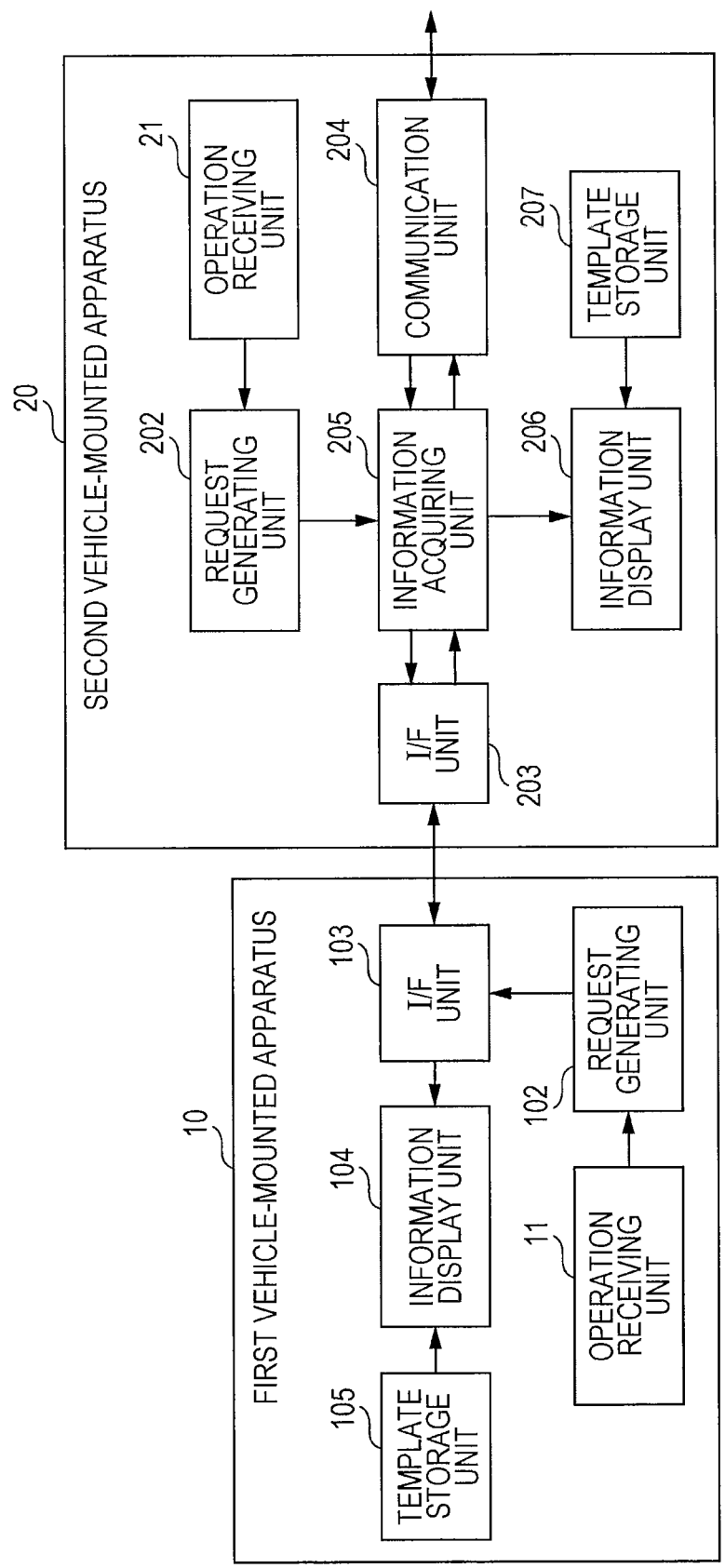
FIG. 7 is a block diagram showing functional component examples of the vehicle-mounted apparatuses according to the second embodiment.

Next, a second embodiment of the present invention will be described with reference to the attached drawings. The overall configuration of a screen display control system according to the second embodiment is similar to that in FIG. 1. FIG. 7 is a block diagram showing functional component examples of the vehicle-mounted apparatuses 10 and 20 according to the second embodiment. Notably, like numbers refer to like components having the same functions in FIG. 3 and FIG. 7, and the repetitive description will be omitted.

As illustrated in FIG. 7, the first vehicle-mounted apparatus 10 includes functional components of an operation receiving unit 11, a request generating unit 102, an I/F unit 103, an information display unit 104 and a template storage unit 105. The second vehicle-mounted apparatus 20 includes functional components of an operation receiving unit 21, a request generating unit 202, an I/F unit 203, a communication unit 204, an information acquiring unit 205, an information display unit 206 and a template storage unit 207.

The request generating unit 102 in the first vehicle-mounted apparatus 10 generates a text-based content acquisition request in accordance with the operation received by the operation receiving unit 11. According to the second embodiment, a handler-based content-acquisition-request generation notification is not transmitted from the second vehicle-mounted apparatus 20. The request generating unit 102 thus does not perform the processing of generating a text-based content acquisition request in response to the generation notification.

The I/F unit 103 exchanges information with the second vehicle-mounted apparatus 20 over an in-vehicle network. For example, the I/F unit 103 transmits a text-based content acquisition request generated by the request generating unit 102 to the second vehicle-mounted apparatus 20. The I/F unit 103 receives integrated information (which will be described in detail below) transmitted from the second vehicle-mounted apparatus 20 and supplies it to the information display unit 104.

The information display unit 104 acquires common information and individual information to be shown as a text-based content in the first vehicle-mounted apparatus 10 out of the integrated information transmitted from the second vehicle-mounted apparatus 20 through the I/F unit 103. The text-based content containing the common information and individual information is shown on a large screen display of the first vehicle-mounted apparatus 10.

Here, the term "common information" refers to information to be commonly shown in the plurality of vehicle-mounted apparatuses 10 and 20 out of the same type of information (text-based content and handler-based content) to be shown in the plurality of vehicle-mounted apparatuses 10 and 20. In other words, it refers to information to be shown commonly as part of both text-based content and handler-based content.

The term "individual information" refers to information excluding the part corresponding to the common information out of the same type of information (text-based content and handler-based content) to be shown in the plurality of vehicle-mounted apparatuses 10 and 20. The term "integrated information" refers to the same type of information to be shown in the plurality of vehicle-mounted apparatuses 10 and 20 and information as a result of identifiable integration of the common information and individual information for its corresponding apparatus.

FIG. 8 illustrates an example of the integrated information. FIG. 8 shows common information 81 for a text-based content and a handler-based content, individual information 82 for the text-based content, and individual information 83 for the handler-based content. In the example in FIG. 8, the integrated information is represented by JSON (JavaScript Object Notation) data. In other words, the integrated information illustrated in FIG. 8 includes an ID code 80 indicative of a specific display template, the common information 81, and the individual information pieces 82 and 83. In the example in FIG. 8, a display template with ID code [1] and a display template with ID code [2] are used.

In the JSON data illustrated in FIG. 8, each of the common information 81 and individual information pieces 82 and 83 are identifiable with levels indicated by the part in the parenthesis [ ]. In other words, the part in the first level [ ] is the common information 81, and the part in the second level [ ] is the individual information pieces 82 and 83. The description order of the ID code 80 is matched with the description order of the individual information pieces 82 and 83. That is, the first ID code [1] corresponds to the first individual information 82, and the second ID code [2] corresponds to the second individual information 83.

Figure 9A:
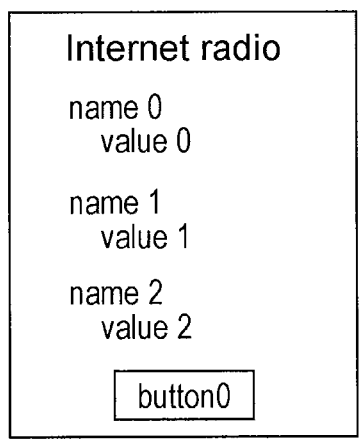
FIGS. 9A and 9B illustrate examples of the display templates to be used according to the second embodiment.
Figure 9B:
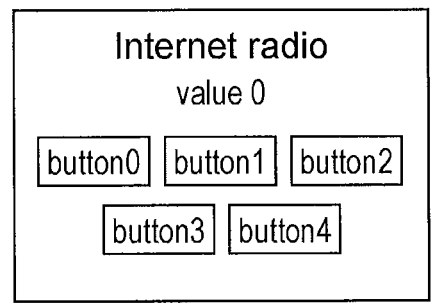
Figure 11:
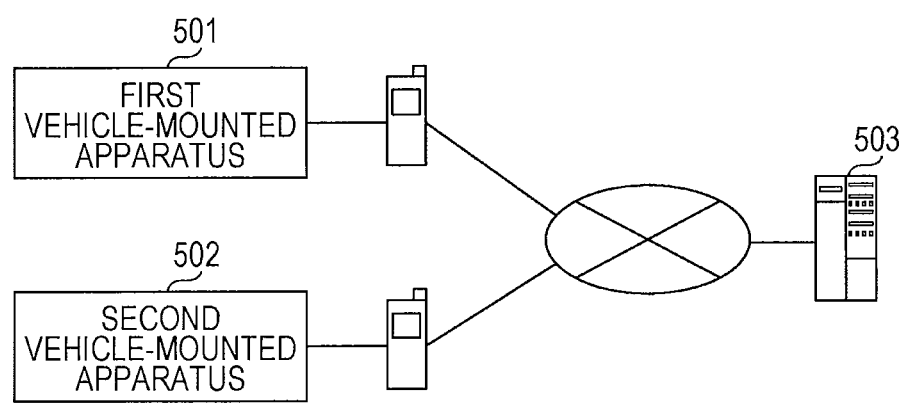
FIG. 11 illustrates an overall configuration example of a conventional screen display control system.

FIGS. 9A and 9B illustrate examples of the display templates. FIG. 9A illustrates a display template with ID code [1], and FIG. 9B illustrates a display template with ID code [2]. Notably, the display template with ID code [1] corresponds to a screen example of the text-based content illustrated in FIG. 2A. The display template with ID code [2] corresponds to a screen example of the handler-based content illustrated in FIG. 2B. These display templates are prestored in the template storage unit 105.

The information display unit 104 described above extracts ID code [1] of its apparatus from the integrated information illustrated in FIG. 8 and reads the display template (shown in FIG. 9A) identified with ID code [1] from the template storage unit 105. A display screen is created by pasting the common information 81 and individual information 82 thereon in a style defined by the display template and is shown on the display.

The request generating unit 202 in the second vehicle-mounted apparatus 20 generates a handler-based content acquisition request in accordance with the operation received by the operation receiving unit 21. The request generating unit 202 supplies the generated handler-based content acquisition request to the information acquiring unit 205. According to the second embodiment, even when the request generating unit 202 receives a text-based content acquisition request from the first vehicle-mounted apparatus 10 through the I/F unit 23, the request generating unit 202 does not perform processing of generating a handler-based content acquisition request in response thereto.

The I/F unit 203 exchanges information with the first vehicle-mounted apparatus 10 over an in-vehicle network. For example, the I/F unit 203 receives a text-based content acquisition request transmitted from the first vehicle-mounted apparatus 10 and supplies it to the request generating unit 202 and information acquiring unit 205. The I/F unit 203 transmits the integrated information acquired by the information acquiring unit 205 through the communication unit 204 to the first vehicle-mounted apparatus 10.

The communication unit 204 uses a communication function of the cellular phone 30 to transmit a content acquisition request to the server 50 over the Internet 40 and receives the integrated information from the server 50 in response thereto. According to the second embodiment, integrated information is received from the server 50 in response to both of a text-based content acquisition request issued by the first vehicle-mounted apparatus 10 and transmitted to the server 50 and a handler-based content acquisition request issued by the second vehicle-mounted apparatus 20 and transmitted to the server 50.

When one of the vehicle-mounted apparatuses 10 and 20 issues a content acquisition request, the information acquiring unit 205 transmits the acquisition request to the server 50 through the communication unit 204. In response to the transmission of the content acquisition request, the information acquiring unit 205 acquires the integrated information from the server 50 through the communication unit 204. The integrated information in this case is information as a result of integration of the same type of information pieces (text-based content and handler-based content) to be shown in the vehicle-mounted apparatuses 10 and 20 with respect to the content according to the acquisition request. The information acquiring unit 205 supplies the acquired integrated information to the information display unit 206 and transmits it to the first vehicle-mounted apparatus 10 through the I/F unit 203.

The information display unit 206 acquires common information and individual information to be shown as a handler-based content in the second vehicle-mounted apparatus 20 out of the integrated information acquired by the information acquiring unit 205 from the server 50. The handler-based content including the common information and individual information is shown on the small-screen display of the second vehicle-mounted apparatus 20.

More specifically, the information display unit 206 extracts ID code [2] of its apparatus from the integrated information illustrated in FIG. 8 and reads the display template (illustrated in FIG. 9B) identified with the ID code [2] from the template storage unit 207. A display screen is created by pasting the common information 81 and individual information 83 thereon in a style defined by the display template and is shown on the display. Notably, the template storage unit 207 also prestores the same display templates as those in the template storage unit 105.

In the display template with the ID code [2] illustrated in FIG. 9B, only the "value 0" is code representing a character string to be pasted. Thus, the character string "Have a nice day" corresponding to the "value 0" in the common information 81 illustrated in FIG. 8 is to be actually pasted to the display template.

Next, there will be described an operation of the screen display control system according to the second embodiment configured as described above. FIG. 10 is a flowchart of an operation example to be performed when the request generating unit 202 in the second vehicle-mounted apparatus 20 generates a handler-based content acquisition request. Notably, the flowchart illustrated in FIG. 10 starts when the operation receiving unit 21 in the second vehicle-mounted apparatus 20 receives an operation for a handler-based content acquisition request.

First of all, the request generating unit 202 generates a handler-based content acquisition request (step S31) and supplies it to the I/F unit 23 and information acquiring unit 205. The information acquiring unit 205 transmits the handler-based content acquisition request to the server 50 through the communication unit 204 (step S32).

The server 50 transmits integrated information as a result of integration of the same type of information pieces (text-based content and handler-based content) to be shown in the vehicle-mounted apparatuses 10 and 20 to the second vehicle-mounted apparatus 20 (step S33) in response to the handler-based content acquisition request transmitted from the second vehicle-mounted apparatus 20. In the second vehicle-mounted apparatus 20, the information acquiring unit 205 acquires the integrated information transmitted from the server 50 and transmits it to the first vehicle-mounted apparatus 10 through the I/F unit 203 (step S34).

In the second vehicle-mounted apparatus 20, the information display unit 206 extracts ID code [2] of its apparatus from the integrated information acquired from the server 50 by the information acquiring unit 205 and reads the display template identified with ID code [2] from the template storage unit 207. The second vehicle-mounted apparatus 20 acquires the common information 81 and individual information 83 to be shown as a handler-based content from the integrated information. A display screen is created by pasting them thereon in a style defined by the display template and is shown on the display (step S35).

In the first vehicle-mounted apparatus 10, ID code [1] of its apparatus is extracted from the integrated information transmitted from the second vehicle-mounted apparatus 20, and the display template identified with ID code [1] is read from the template storage unit 105. The first vehicle-mounted apparatus 10 acquires the common information 81 and individual information 82 to be shown as a text-based content from the integrated information. A display screen is created by pasting them thereon in a style defined by the display template and is shown on the display (step S36). Then, the processing in the flowchart illustrated in FIG. 10 ends.

Notably, an operation, not shown, when the request generating unit 102 in the first vehicle-mounted apparatus 10 generates a text-based content acquisition request is the same as the operation in the flowchart illustrated in FIG. 10 except that the text-based content acquisition request is transmitted to the server 50 through the second vehicle-mounted apparatus 20.

As described above in detail, according to the second embodiment, when one of the plurality of vehicle-mounted apparatuses 10 and 20 issues a content acquisition request, the same type of information (text-based content and handler-based content) to be shown in the plurality of vehicle-mounted apparatuses 10 and 20 is acquired by the information acquiring unit 205 from the server 50. The information display units 104 and 206 then acquire the information to be shown in the respective vehicle-mounted apparatuses 10 and 20 from the same type of information acquired by the information acquiring unit 205 and cause the respective displays to display the information.

According to the thus configured second embodiment, like the first embodiment, when one of the plurality of vehicle-mounted apparatuses 10 and 20 performs an operation for a content acquisition request, the same type of information pieces to be shown with respect to the content may be shown on each of the displays of the plurality of vehicle-mounted apparatuses 10 and 20.

Furthermore, according to the second embodiment, in both cases when the first vehicle-mounted apparatus 10 issues a text-based content acquisition request and when the second vehicle-mounted apparatus 20 issues a handler-based content acquisition request, the corresponding text-based content and handler-based content may be shown on the displays of the first vehicle-mounted apparatus 10 and second vehicle-mounted apparatus 20 in synchronization without time lag.

In other words, according to the first embodiment, as illustrated in the flowchart in FIG. 6, when the second vehicle-mounted apparatus 20 issues a handler-based content acquisition request, a delay in display timing may occur during a period from the display of the corresponding handler-based content in the second vehicle-mounted apparatus 20 in step S15 to the display of the corresponding text-based content in the first vehicle-mounted apparatus 10 in step S21. This is because the second vehicle-mounted apparatus 20 transmits content acquisition requests to the server 50 at different times, and the text-based contents and handler-based contents transmitted separately are displayed in the vehicle-mounted apparatuses 10 and 20.

On the other hand, according to the second embodiment, one content acquisition request is transmitted from the second vehicle-mounted apparatus 20 to the server 50, and integrated information is transmitted once from the server 50 in response thereto. Because, in the vehicle-mounted apparatuses 10 and 20, only the information required for its apparatus is extracted from the integrated information to create a display screen, the text-based content and handler-based content may be shown in the vehicle-mounted apparatuses 10 and 20 substantially without time lag.

The second embodiment may provide an advantage of reduction of the amount of data to be transmitted from the server 50, compared with the first embodiment in which a text-based content and a handler-based content are transmitted separately. In other words, only the integrated information is required to transmit from the server 50, and its amount of data is less than the total amount of data of the text-based content and the handler-based content.

According to the aforementioned embodiments, the vehicle-mounted apparatuses 10 and 20 are given as an example of the electronic apparatus configuring the screen display control system. However, the present invention is not limited thereto. In other words, any electronic apparatuses other than vehicle-mounted apparatuses 10 and 20 are applicable if they may show the same type of information pieces on a plurality of displays in synchronization.

According to the aforementioned embodiment, Internet radio is given as an example of the content to be shown on a plurality of displays. However, the present invention is not limited thereto. According to the aforementioned embodiments, the same type of information pieces are a text-based content and a handler-based content, for example. However, the present invention is not limited thereto.

According to the second embodiment, JSON data is used to configure the integrated information. However, the present invention is not limited thereto. In other words, any data format is applicable if it allows identification of common information to be shown commonly in a plurality of electronic apparatus and individual information to be shown separately in a plurality of electronic apparatus.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A screen display control system having a plurality of electronic apparatuses each having a display, the plurality of electronic apparatuses being connected to each other, at least one of the plurality of electronic apparatuses being connected to a server over the Internet, the information acquired from the server over the Internet being shown on the displays of the plurality of electronic apparatuses, the system comprising:
   an information acquiring unit which, when one of the plurality of electronic apparatuses issues a content acquisition request, acquires from the server through the electronic apparatus connectable to the Internet the same type of information to be shown synchronized in time in the plurality of electronic apparatuses with respect to the content according to the acquisition request; and
   information display units which cause the displays to display the information acquired by their electronic apparatuses to be shown synchronized in time in the electronic apparatuses from the same type of information acquired by the information acquiring unit;
   wherein the same type of information for the plurality of electronic apparatuses comprises at least two kinds of information from one content source which are not completely the same but are related to each other, and
   wherein information to be shown in synchronization in the plurality of electronic apparatuses is integrated information combining common information to be shown commonly in each of the plurality of electronic apparatuses and individual information to be shown separately in a corresponding one of the plurality of electronic apparatuses;
   the information acquiring unit acquires the integrated information from the server; and
   the information display units cause the displays to display the common information and the individual information to be shown in the corresponding apparatuses acquired by the plurality of electronic apparatuses from the integrated information acquired by the information acquiring unit, to show on the displays.

2. The screen display control system according to claim 1, wherein the information acquiring unit acquires the same type of information to be shown in synchronization in the plurality of electronic apparatus separately from the server; and
   the information display units cause the displays to display information to be shown in their apparatuses acquired by the plurality of electronic apparatuses from the same type of information acquired separately by the information acquiring unit.

3. The screen display control system according to claim 1, wherein the integrated information includes an ID code indicative of a specific display template and the common information and the individual information;
   each of the information display units extracts the ID code from the integrated information, reads the display template identified with the ID code from a template storage unit, creates a display screen by pasting the common information and the individual information in a style defined by the display template, and causes the display to display it.

4. A screen display control method in a system having a plurality of electronic apparatuses each having a display, the plurality of electronic apparatuses being connected to each other, at least one of the plurality of electronic apparatuses being connected to a server over the Internet, the information acquired from the server over the Internet being shown on the displays of the plurality of electronic apparatuses, the method comprising:
   an information acquiring step of, when one of the plurality of electronic apparatuses issues a content acquisition request, acquiring from the server by the electronic apparatus connectable to the Internet the same type of information to be shown synchronized in time in the plurality of electronic apparatuses with respect to the content according to the acquisition request; and
   an information display step of causing the displays to show on the displays the information acquired by their electronic apparatuses to be shown synchronized in time in the electronic apparatuses from the same type of information acquired by the information acquiring step;
   wherein the same type of information for the plurality of electronic apparatuses comprises at least two different kinds of information from one content source which are not completely the same but are related to each other, and the different kinds of information shown on the display of each electronic apparatus are dependent on the size of the display.

5. The screen display control system according to claim 4, wherein the same type of information to be shown in synchronization in the plurality of electronic apparatuses is integrated information containing common information to be shown commonly in the plurality of electronic apparatuses and individual information to be shown separately in the corresponding one of the plurality of electronic apparatuses, the common information and the individual information being identifiable;
the information acquiring step acquires the integrated information from the server; and
the information display step causes the displays to show the common information and the individual information to be shown in the corresponding apparatuses acquired by the plurality of electronic apparatuses from the integrated information acquired by the information acquiring step, to show on the displays.

6. A screen display control system having a plurality of electronic apparatuses each having a display, the plurality of electronic apparatuses being connected to each other, at least one of the plurality of electronic apparatuses being connected to a server over the Internet, the information acquired from the server over the Internet being shown on the displays of the plurality of electronic apparatuses, the system comprising:
an information acquiring unit which, when one of the plurality of electronic apparatuses issues a content acquisition request, acquires from the server through the electronic apparatus connectable to the Internet the same type of information to be shown synchronized in time in the plurality of electronic apparatuses with respect to the content according to the acquisition request; and
information display units which cause the displays to display the information acquired by their electronic apparatuses to be shown synchronized in time in the electronic apparatuses from the same type of information acquired by the information acquiring unit;
wherein the same type of information for the plurality of electronic apparatuses comprises at least two different kinds of information from one content source which are not completely the same but are related to each other, and the different kinds of information shown on the display of each electronic apparatus comprise either text-based information or handler-based information, where text-based information primarily comprises text and handler-based information primarily comprises operation icons.

7. The screen display control system according to claim 6, wherein the information acquiring unit acquires the same type of information to be shown in synchronization in the plurality of electronic apparatus separately from the server; and
the information display units cause the displays to display information to be shown in their apparatuses acquired by the plurality of electronic apparatuses from the same type of information acquired separately by the information acquiring unit.

8. The screen display control system according to claim 6 wherein the same type of information to be shown in synchronization in the plurality of electronic apparatuses is integrated information containing common information to be shown commonly in the plurality of electronic apparatuses and individual information to be shown separately in the corresponding one of the plurality of electronic apparatuses, the common information and the individual information being identifiable;
the information acquiring unit acquires the integrated information from the server; and
the information display units cause the displays to display the common information and the individual information to be shown in the corresponding apparatuses acquired by the plurality of electronic apparatuses from the integrated information acquired by the information acquiring unit, to show on the displays.

9. The screen display control system according to claim 8, wherein the integrated information includes an ID code indicative of a specific display template and the common information and the individual information;
each of the information display units extracts the ID code from the integrated information, reads the display template identified with the ID code from a template storage unit, creates a display screen by pasting the common information and the individual information in a style defined by the display template, and causes the display to display it.

* * * * *